June 5, 1923.                                                1,458,069
W. LONDON
FASTENER FOR AUTOMOBILE CHAINS
Filed Feb. 14, 1920
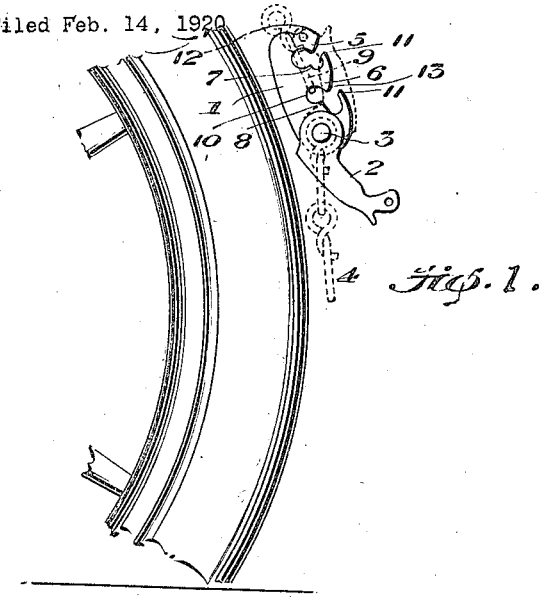
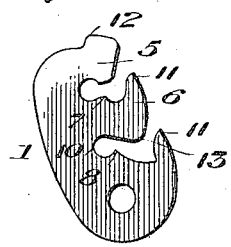
Inventor
Willis London
Witness                          By Vernon E. Hodges
                                    his Attorney Patented June 5, 1923.

1,458,069

UNITED STATES PATENT OFFICE.

WILLIS LONDON, OF FRANKLIN, KENTUCKY.

FASTENER FOR AUTOMOBILE CHAINS.

Application filed February 14, 1920. Serial No. 358,771.

*To all whom it may concern:*

Be it known that I, WILLIS LONDON, a citizen of the United States, residing at Franklin, in the county of Simpson and State of Kentucky, have invented certain new and useful Improvements in Fasteners for Automobile Chains, of which the following is a specification.

My invention relates to an improvement in fasteners for automobile chains.

Heretofore many chains have been lost, due to the form of fastening employed on the ends of the chain, the common type being a hook or double hook with a pivoted clasp, but the nature of this construction is such that the clasp is frequently raised and the link unhooked by the pressure of the mud around it, and in that way releases the chain so that the latter falls off and becomes lost, and frequently inextricably embedded in the mud.

The purpose of my invention is to obviate and overcome this objection, and it consists in a fastener in which the hook or hooks are so formed that the loop must have a more or less circuitous course out of the hook in order to become released, which course it does not readily take.

In the accompanying drawings:—

Fig. 1 is a view showing my improved fastener;

Fig. 2 shows the general outline of my improved form.

The numeral 1 represents the hook member of the fastener, and 2 is the clasp, preferably pivoted thereto by the same pin 3 which holds one end of the chain 4.

The member 1 has two hooks 5 and 6, and opposite these hooks are the inner guards 7 and 8 which tend to hold the link 9 in the inner end of socket 10 of the hook, and the outward guards 11 are in position to arrest the escape of the link from the outer end of the hook, and the shoulder 12 at the rear of hook 5 in co-operation with the shoulder 13 on the opposite side of the hook 6 are relatively so located with respect to each other that a diameter across from one to the other is equal to or greater than the length of the link. So when the latter is placed back of the second hook, these two shoulders in themselves would prevent its accidental escape from the hook.

In short, these several guards and shoulders are of such relative location that they effectually guard the outlet from the hooks by reason of the sinuous or circuitous passageway therebetween, which precludes the straight outward movement of the link at all times, which means the practical impossibility of accidental disconnection or dislodgement, even though the latch itself may open.

I claim:

1. A fastener for chains comprising a body portion having a circuitous slot extending inwardly from one edge thereof, a hook projecting laterally into said circuitous slot, and a shoulder extending outwardly from the end of the body portion in opposite direction from the hook, in combination with a link which is less in length than the distance between the ends of the oppositely disposed hook and shoulder, whereby the link is prevented from passing the ends of the hook and shoulder at the same time.

2. A fastening for chains comprising a member having a plurality of circuitous slots extending inwardly from one edge thereof, hooks projecting laterally into said circuitous slots from one of the walls thereof, a shoulder on one side of said hooks extending in opposite direction thereto, in combination with a link which is less in length than the distance between the oppositely disposed hook and shoulder.

3. A fastening for chains comprising a member having a plurality of circuitous slots extending inwardly from one edge thereof, hooks projecting laterally into said circuitous slots from one side of the walls thereof, guards extending laterally into said slots from the opposite wall thereof on either side of said hooks, a shoulder on one of said hooks extending in the opposite direction thereto, in combination with a link which is less in length than the distance between the oppositely disposed hooks and shoulder.

In testimony whereof I affix my signature.

WILLIS LONDON.